Figure 8:
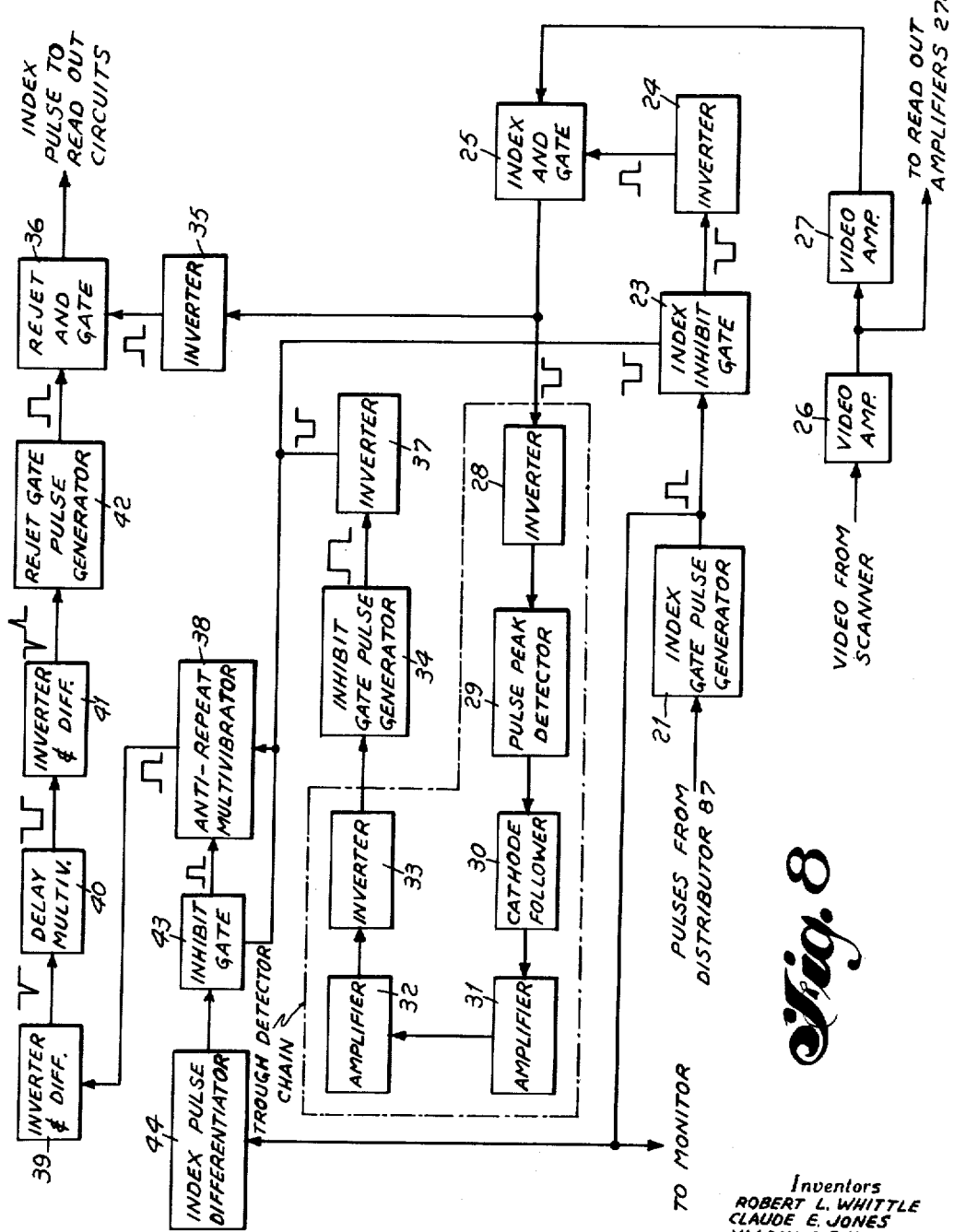

May 22, 1962 R. L. WHITTLE ETAL 3,036,291
DATA PROCESSING SYSTEM
Filed Sept. 16, 1958 6 Sheets-Sheet 1
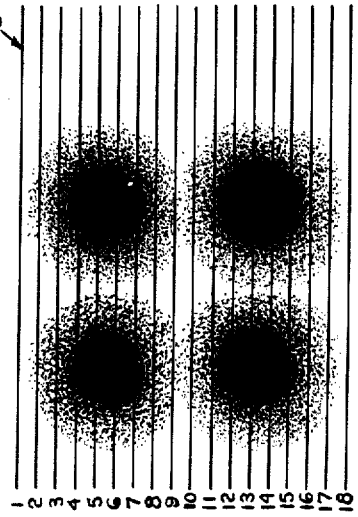
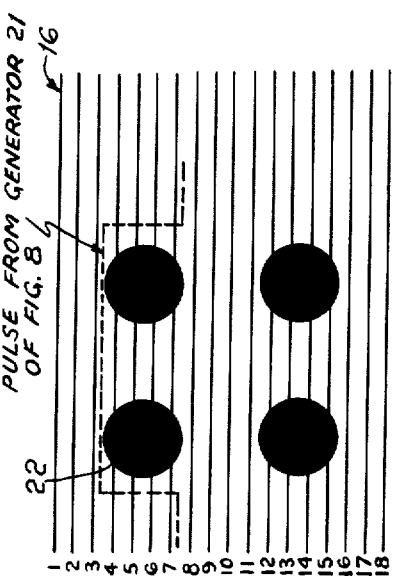
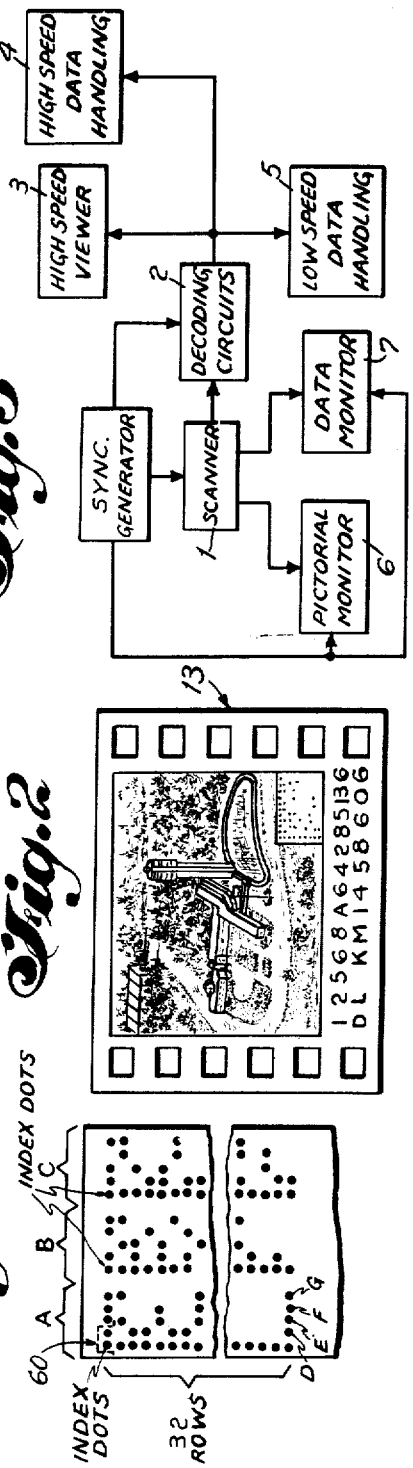
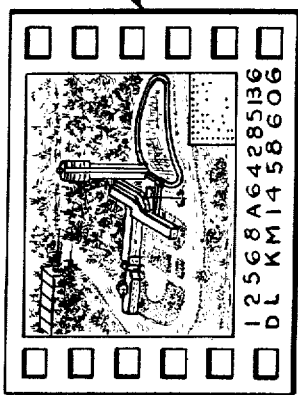
Inventors
ROBERT L. WHITTLE
CLAUDE E. JONES
VLADIMIR P. HONEISER
HOWARD S. MARGETTS
By Philip M. Bolton
Attorney

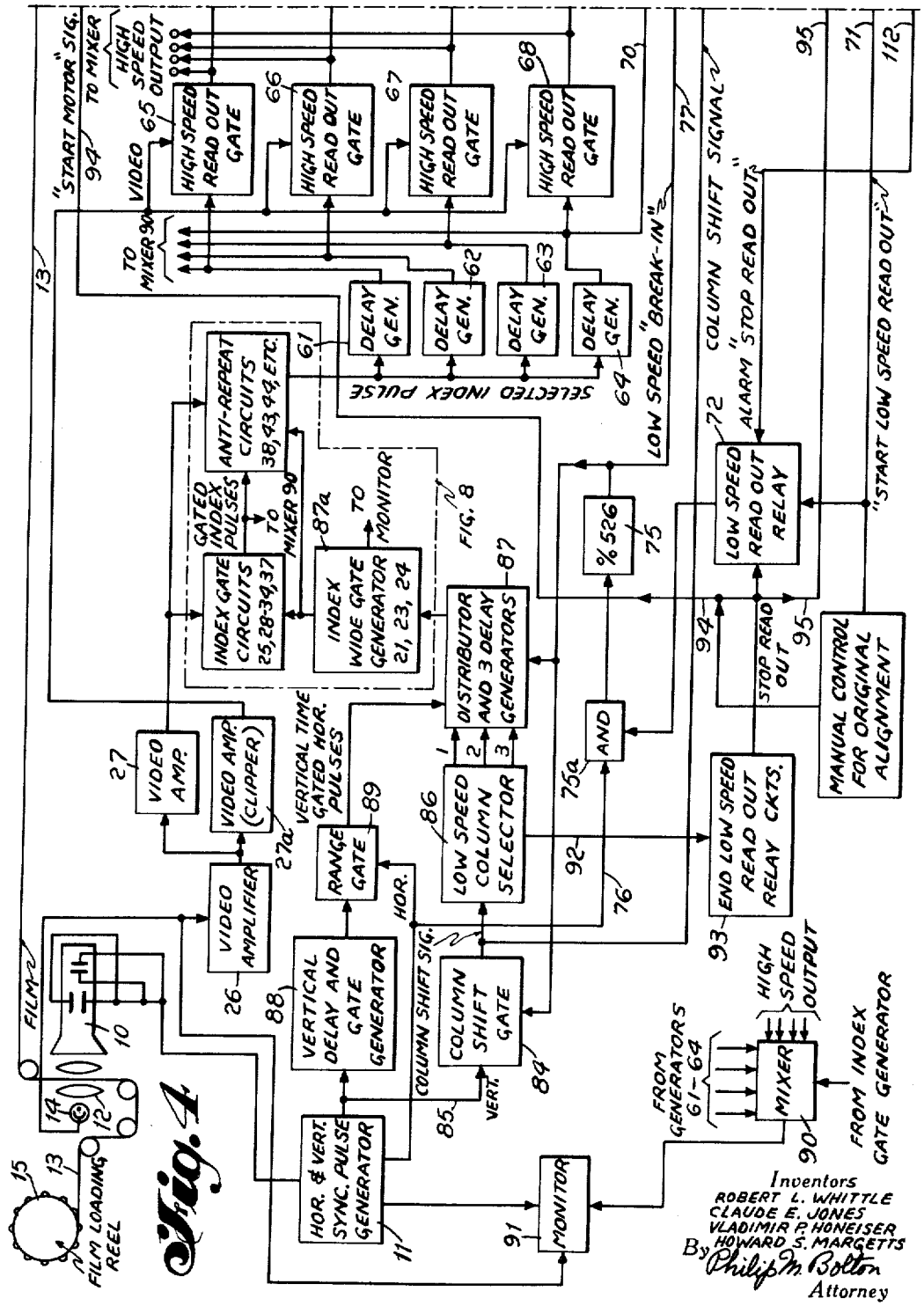

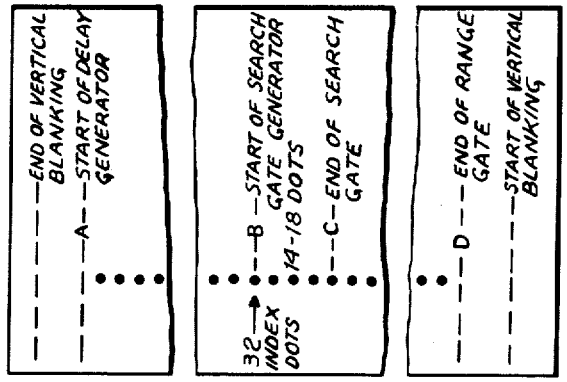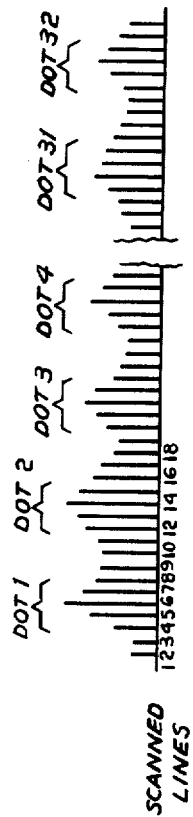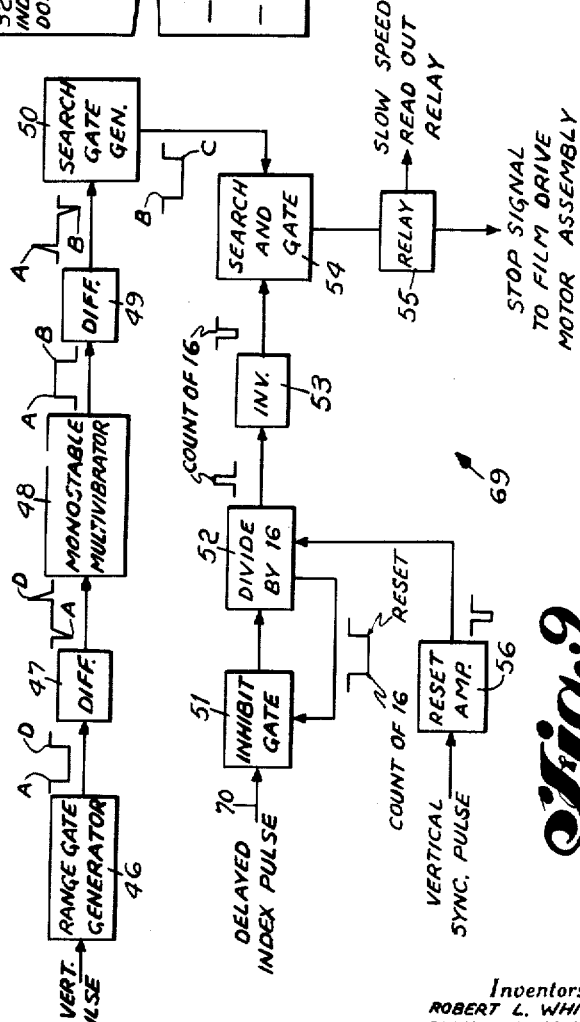

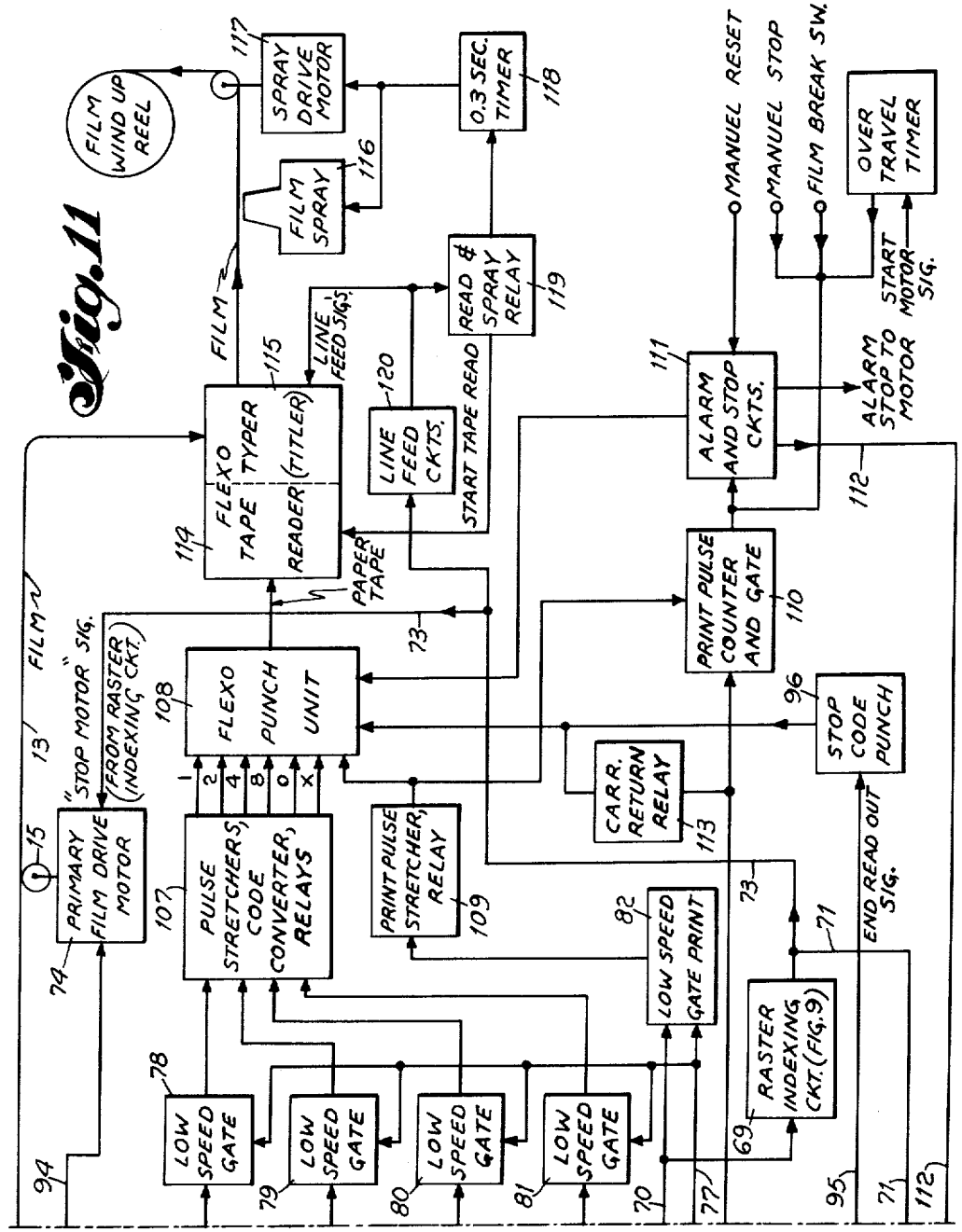

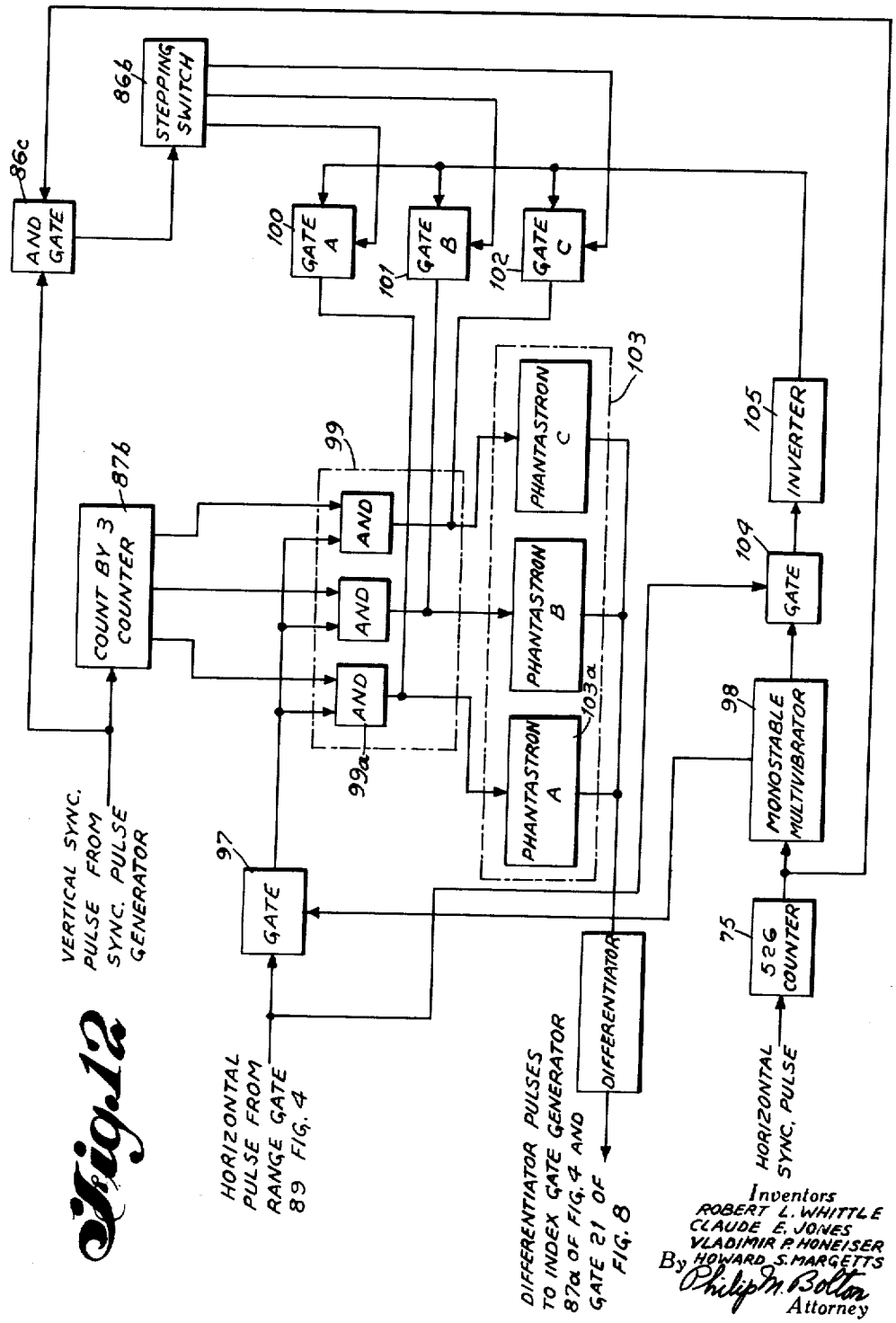

United States Patent Office 3,036,291
Patented May 22, 1962

3,036,291
DATA PROCESSING SYSTEM
Robert L. Whittle, Cedar Grove, N.J., Claude E. Jones, Atlanta, Ga., and Vladimir P. Honeiser, Paramus, and Howard S. Margetts, Lincoln Park, N.J., assignors to International Telephone and Telegraph Corporation, Nutley, N.J., a corporation of Maryland
Filed Sept. 16, 1958, Ser. No. 761,407
15 Claims. (Cl. 340—172.5)

This invention relates to an automatic data processing system and more particularly to a system for reading and decoding recorded digital data.

More specifically, this invention relates to a decoding system including provision for printing the decoded information in alpha-numeric characters on an edge of the recorded medium, and in given physical relation to other related information contained on the recorded medium. For example, the recorded medium may be in the form of film, containing pictorial information, and the decoded data would be printed on the frame to which the data pertains. Film, as a recording medium, is particularly desirable where it is necessary to correlate pictorial information with other relevant data.

Until recently, however, little use has been made of photographic film as a medium for high speed recording and read-out, because considerable difficulty has been experienced in applying and reading the coded information at a speed which was complementary to the operational speeds of other dependent functional units; for example, the computer.

The chief obstacle to the use of film, however, was removed by the development of a system which utilized a cathode-ray tube for both projecting a coded raster on a portion of the film and reading said coded raster therefrom. This system of television digital read-out and decoding is disclosed in copending application to C. E. Jones, Serial No. 507,205, filed May 10, 1955, now U.S. Patent #2,916,727, for "Data Processing System" and assigned to the assignee of this application.

Film recording by exposing the film to a cathode-ray tube raster containing the coded information, however, introduces certain problems related to the functioning of the cathode-ray tube. For example, there are the problems of data raster keystoning, skew, vertical and horizontal nonlinearity, and varying column spacing in a multi-column code format. Lateral movement of film in the recording camera also causes slight changes in the raster positioning.

This invention is an improvement and extension of the basic system. The above-mentioned application, covering the basic system, is directed to read out and decoding circuits. This invention is directed to a complete "machine" for processing automatically a roll or slides of film containing digital data and photographs. The invention includes circuitry designed to attain maximum system reliability and accuracy for high speed presentation of data on an alpha numeric viewer, while extracting information at a low speed for Flexowriter printing of the information on the appropriate film frames.

Accordingly, it is a primary object of the invention to provide a complete system, capable of performing the functions described above with efficiency and reliability.

It is a further object of the invention to provide a data decoder and typing system capable of decoding data and typing out these data on each frame of the original negative in permanent form.

It is still a further object of the invention to provide such a scanning system, which is relatively unaffected by the attendant problems of cathode-ray tube film recording, including read out and decoding circuits compatible with the scanner.

It is a further object of the invention to provide an automatically controllable film transport system capable of moving the film from a supply reel, to the scanning station, then to the titling position, and finally into a wind-up spool.

In accordance with an aspect of the invention, there is provided a data processing system comprising film and a transport system for the film. The film is caused to move in front of a scanning device which "searches" for the digital data. After counting a predetermined number of index dots, the film is stopped. The data is then read-out at a high TV rate, while simultaneously the data is decoded at a slow rate and fed to a Flexowriter unit where the information is stored on punched paper tape. The information on the paper tape is later read out and typed on the edge of a picture frame positioned in a typewriter; movement of the paper tape is synchronized with the film so that information is typed on the correctly related film frame. Meanwhile, a frame that has been previously typed is sprayed with protective material to form a coating over the typed characters. During this process the film is moving continuously into the wind-up reel for storage.

The above-mentioned and other features and objects of this invention and the manner of attaining them will become more apparent and the invention itself will be best understood by reference to the following description of an embodiment of the invention taken in conjunction with the accompanying drawings, wherein:

FIG. 1 is an illustration of a coded raster;
FIG. 2 shows a complete film frame, including a pictorial representation, the coded raster and the coded information in alpha-numeric form;
FIG. 3 is a general layout of the complete system;
FIGS. 4 and 11, placed side-by-side, are schematic diagrams of the complete system;
FIGS. 5 and 6 are enlarged representations of a detail of the recorded data;
FIG. 7 is a graphic representation of signals in the system;
FIG. 8 is a detailed schematic diagram of indexing circuits;
FIG. 9 is a schemtaic diagram of a raster indexing circuit;
FIG. 10 is a time chart of operations of the raster indexing circuit in relation to the index dots; and
FIG. 12 is a schematic diagram of high-speed and low-speed readout circuits.

Manifestly, the readout operation is a sequel to the encoding and recording operations; it would be helpful, therefore, first, to have an understanding of the format of the recorded data. The data recording equipment is of the digital type which accepts inputs from several sources. By way of example, the encoding-recording equipment may be an airborne device capable of accepting data in analog form from appropriate sensing instruments. The device converts these data into a digital code, which is displayed on a cathode-ray tube. The code may take any of several forms, one preferred form being shown in FIG. 1. The illustrated code format consists of three columns, A, B and C of 32 rows each. Each column comprises index marks, or dots, and space for four information marks. The encoded raster is photographed preferably in one corner of each film frame, as shown in FIG. 2. The remaining part of the frame contains a pictorial representation pertaining to the coded information.

The purpose of this invention is to decode the data and automatically type the decoded information, in alpha-numeric characters, for example, along the lower edge, as shown, on each frame of the original negative in permanent form.

The read-out and titler system is illustrated by block diagram in FIG. 3. Generally, each frame of the film negative is scanned by a flying spot scanner 1 and the resulting video output is delivered to decoding circuits 2. The decoder 2 transforms the sequence of the video, by use of gating circuitry, into two forms; one a high-speed parallel output for viewing with the high-speed viewer 3 and for operating high-speed data handling devices 4; and a low-speed read-out for feeding printing equipment such as automatic typewriters, film titling equipment, and other low-speed data handling devices 5. Code converters are required between the scanner and the data handling equipment and are included in the decoding circuits 2.

The video from the scanner 1 is viewed on monitors 6, 7, one presenting the photographic information as a photopositive and the other presenting the data format as recorded by the encoding equipment.

The low-speed read-out may be utilized to punch a paper tape which serves to store the low speed scanned information, so that the film can be titled several frames after being read by the scanner.

The titling equipment consists of a film transport mechanism, typer, take-up mechanism, automatic controls and failure protective devices.

The basic component parts of the invention will now be described more specifically.

*The Scanner, Film Transport and Synchronizing Generator*

Referring to FIG. 4, the scanner is shown diagrammatically comprising a cathode-ray tube 10, horizontal and vertical synchronizing pulse generator 11, optical equipment 12 for focusing the beam from the cathode-ray tube through the film frame 13, to a photoelectric tube 14. The photoelectric tube 14 is responsive to the quanta of light passing through the film. The scanning device may be a Vidicon, flying spot scanner or other appropriate TV camera. For the purpose of this illustration, there is shown a flying spot scanner.

In practice, two flying spot scanners may be used with two optical systems. One camera scans the entire frame and the other scans only the digital data. Since the invention is concerned primarily with the read out of the digital data, only the camera for performing this function is shown.

A film transport, shown diagrammatically as sprocket wheels 15, moves the film 13 into a position so that a desired frame can be read.

The horizontal and vertical synchronizing pulse generator 11 delivers a standard RETMA set of synchronizing and blanking pulses. The generator may be controlled either from a 60 cycle A.C. line, or from a crystal oscillator running at a frequency of 315 kc., which is suitably divided down to the horizontal and vertical synchronizing frequencies.

*Video Amplifier*

In FIG. 4 video amplifiers 26, 27 are coupled to the output of the flying spot scanner and serve to boost the video output to a level usable by the various decoder gates. The amplifier 27a is of a type which employs negative peak clipping to reduce background noise, and positive peak clipping for constant video pulse amplitudes.

*Decoder*

The function of the decoder is to receive video signals from the scanner and provide high-speed decoded output for an alpha-numeric viewer or monitor, as well as low-speed decoded output for operating a Flexowriter or teleprinter. The decoder also provides for film drive control and means for visual observation of the digital data being scanned.

Before proceeding with an explanation of the several decoding circuits, a detailed explanation of the scanning and indexing processes would be useful.

FIG. 1 shows a recorded data format consisting of three columns of 32 binary coded characters arranged vertically. The first vertical line of dots in each of the three columns consists of the index dots. The dots in each horizontal row following each index dot contain binary coded information representing one character to be read out.

One of the initial operations in the system logic is the detection of the dots. FIG. 5 shows superposition of eighteen TV scanning lines 16 across two ideal dots of two rows of dots. The scanner equipment generates a video pulse each time that the scanning beam, which moves from left to right, intersects a dot. Since an ideal optical specimen has been assumed, all dots would have the same density and all maximum video pulses would be equal in amplitude. In actual practice, however, ideal dots shown in FIG. 5 are never obtained. FIG. 6 shows the type of image that is actually encountered. It is seen that true "white" is not obtained on scan-lines 8, 9, 10 and 11. Furthermore, the density of the index dots may vary from the top to bottom of the vertical raster. Background density also may vary.

FIG. 7 shows the type of output that may be obtained from the dots shown in FIG. 6.

From FIG. 7 it is seen that the absolute magnitude of each crest varies so that the peak pulse amplitudes due to some dots are only as great as the pulses due to the gray background between other dots. This is illustrated by dots 1, 2, 31 and 32. Black pulses from 31 and 32 are only as great as gray pulses between dots 1 and 2. The minimums, or troughs, rather than peaks, are, therefore detected. A detailed description of a suitable trough detector may be found in copending application of V. P. Honeiser, Serial No. 735,267, filed May 14, 1958, for "Signal Detector" and assigned to the same assignee as this application.

*Gating Pulse Generating Circuits*

The method of generating gating pulses required to extract index pulses from composite video will now be described in connection with FIG. 8. Pulses from the distributor 87 are passed to the index gate pulse generator 21. The gate pulse generator 21 is a monostable multivibrator. Its output pulse width is adjusted to select index pulses only from a given column, i.e. A, B or C of FIG. 1. An example of the pulse width form is shown in FIG. 5 by dashed lines about index dot 22. The pulse waveform is wider than the index dot in order to take care of column skew, ripple, etc. The pulses from distributor 87, as will be explained hereinafter, are applied to trigger the monostable multivibrator 21, which transfers to its unstable state for a predetermined time. The positive output from the generator 21 is fed to an inhibit gate 23.

The inhibit gate 23 serves to invert and pass the pulses with limitations from the gate generator 21. The duration of the output pulse is limited by a negative pulse, shown schematically at the top of the block 23 in the diagram. The source of this negative pulse and the reason for limiting the duration of the output pulse from the inhibit gate 23 will be explained later. Suffice it to say for the present that the negative cut-off pulse is of sufficient amplitude to cause the gate 23 to perform the role of an inhibitor to pulses from gate generator 21.

The negative output pulse from gate 23 is applied to an inverter 24 in order to furnish positive gating pulses to an "and" gate 25.

*Index Pulse Generator Circuit*

The "and" gate circuit is designed to produce a negative output pulse when a positive pulse is applied thereto from inverter 24, in time-coincidence with a positive pulse from video amplifier 27.

Video from the scanner system is amplified by amplifiers 27, 26 and applied to "and" gate 25.

The output pulse of gate 25 is fed through a trough detector chain comprising inverter 28, pulse peak detector 29, cathode follower 30, amplifiers 31, 32 and inverter 33, and triggers inhibit gate pulse generator 34. Generator 34 is a monostable multivibrator. The operation of the trough detector circuit is explained in detail in the above-mentioned copending application of V. P. Honeiser, entitled "Signal Detector." The duration of the output pulse from gate generator 34 is not critical as long as it extends beyond the trailing edge of the pulses generated by gate generator 21. As can be seen from FIG. 5 if the trough detector should detect a meaningful black mark so as to produce an output from the generator 34, the pulse from 21 should be cut short to prevent the subsequent video signals from being passed into the system in order to prevent spurious signals which might be spawned by the subsequent video. Hence, the rise time of the leading edge of the pulse from 34 is kept sufficiently short to make certain that the inhibitor gate 23 to which these pulses are passed, is closed prior to the arrival of the subsequent video signal at gate 25. The shortened pulse applied to gate 25 from gate 23, therefore, permits only the index pulse to pass through. The index pulses are fed in addition to the trough detector circuit to inverter 35 and the corresponding positive output pulses are applied to a reject "and" gate 36.

The output from gate generator 34 is a positive pulse, which is inverted in buffer-amplifier 37 and the corresponding negative output pulse is used in addition to inhibiting index gate 23 to trigger and "anti-repeat" multivibrator 38.

Anti-repeat multivibrator 38 is a bistable multivibrator. A pulse from inverter 37, which results, as explained above, when the trough detector circuit has detected an acceptable black dot, triggers the multivibrator 38 to a first stable state. The output of the multivibrator 38 is passed through the differentiator and inverter 39 to produce a sharp negative pulse. This sharp negative pulse is then passed to the delay multivibrator 40. The delay multivibrator 40 is a monostable multivibrator whose unstable state output is inverted and differentiated at the inverter-differentiator 41 to produce a trigger pulse. The trigger pulse from inverter-differentiator 41 is passed to the reject gate generator 42 which is also a monostable multivibrator. The unstable state output of the generator 42 is passed to the reject "and" gate 36 to condition this gate so as to accept the video signal at a predetermined index dot time. The video signal which passes through the reject "and" gate 36 is the signal which results, normally, from the video scan of the dot following the scan whose signal was detected by the trough detector. In other words, as illustrated in FIG. 5, if line 4 produced a pulse output at 34, at index dot time, then the video signal which results from the scanning of line 5 would pass through the reject "and" gate 36. The scanning operation will attempt to pass video at the sixth and seventh line scan of FIG. 5 but these video signals will not pass the reject "and" gate 36 because the generator 42 holds the gate 36 open for approximately the time of one complete line scan. The multivibrators 40 and 42 provide a delay that can be adjusted to accept, for instance, the sixth line video if this video signal should be desired instead of the fifth line as in the illustration above.

Since there are 32 index dots per column, multivibrator 38 is triggered 32 times per field, giving an index pulse rate of $$\frac{32}{1/30} = 960 \text{ p.p.s.}$$

To summarize a cycle of index dot selection, let us assume that a video pulse is generated by scan line 4, FIG. 5. The video pulse is amplified by amplifiers 27 and 26 and passed to gate 25. Gate generator 21 furnishes the required gating pulse to open gate 25, at the proper time; this gating pulse is shown superimposed on a dot in FIG. 5. The pulse from gate 25 passes through the trough detector chain and triggers monostable multivibrator (inhibit gate pulse generator) 34. The resulting pulse is inverted at 37. The leading edge triggers bistable multivibrator 38. At the same time the negative pulse from inverter 37 shuts off gate 23 so that the gating pulse feeding gate 25 is terminated; gate 25 closes and further video pulses in that row cannot pass through it; i.e., only the index pulse is gated through. The leading edge of the pulse from multivibrator 38 is differentiated at 39 and triggers monostable multivibrator 40.

Index pulses from scan lines 5, 6, and 7 trigger monostable multivibrator 34, but bistable multivibrator 38 does not respond.

Now assume that monostable multivibrator 40 has been adjusted to self-retrigger sometime after the index video pulse from scan line 5 has passed through gate 25. The trailing edge of the pulse from multivibrator 40 is differentiated at 41 and drives monostable multivibrator (reject gate pulse generator) 42 through 41. The positive pulse from generator 42 lasts from about the midpoint of line 5 to the midpoint of line 6 and thus opens gate 36 for the same length of time. In line 6, the index pulse passes through gate 25, is inverted at 35 and passes through gate 36 into the data read-out circuits.

Up to this point, inverter 37 has been furnishing a negative pulse to close inhibit gate 43 to each index gating pulse from generator 21 over line 45 through differentiator 44. When the scanner scans line 8 there is no video signal generated, hence there is no output from the trough detector circuit at the inverter 37. Since there is no output at the inverter 37, the inhibitor "and" gate 43 is not conditioned to block and the index gate pulse from generator 21 is passed to the anti-repeat multivibrator 38 through the index pulse differentiator 44 and inhibitor gate 43 to reset the multivibrator 38. The anti-repeat multivibrator 38 remains reset until "another black" dot at index time is detected, as described above, and as illustrated in FIG. 5, by the twelfth line scan. The cycle then repeats itself allowing one index pulse to be passed by the reject "and" gate 36 for each index dot detected and resetting the anti-repeat circuit when a "white" line is detected. Lines 8, 9, 10, 11 are "white" lines and provide no data. Reset pulses on lines 9, 10 and 11 have no effect on multivibrator 38 once it has been reset by the pulse resulting from line 8.

*Raster Indexing Circuit*

The index dots provide a positive indication of the location of the encoded information. Circuits have now been described for the provision of index dot pulses. However, in order to avoid any possible ambiguity of reading pictorial information as index dots, a circuit is provided for identifying the coded raster.

The raster is identified by detecting a count of 16 index dots within a prescribed vertical period. This allows for missing an index dot, whereas a count of each of the index dots (32) would not.

Generally, the circuit comprises a counter for counting 16 index dots. Upon receiving the 16th dot, a pulse is delivered to a search "and" gate. Meanwhile, a vertical gating pulse is produced lasting from about the 14th to the 18th dots, which constitutes the other input to the search "and" gate. The vertical overlap extending from the 14th to 18th dots allows for vertical shifting of the data raster and for occasional missing of an index dot. This method also allows for a large shift in position of the data raster, since it "searches" for specific data. Searching takes place through pictorial material so that there is a probability, though small, that a 16th dot could be obtained before the data raster was in proper position.

Referring now to FIG. 9, which illustrates the raster indexing circuit, delayed vertical synchronizing pulses are applied to a range gate generator 46. The generator 46 is a monostable multivibrator which is triggered by the synchronizing pulse from its stable state to the unstable state. The generator 46, after an adjusted time delay, retriggers itself to its initial stable condition. A negative pulse, as shown, is derived from the output of the generator 46 and is applied to a differentiator 47. The negative spike waveform A at the output of the differentiator 47 is applied to, and triggers a delay generator 48. The delay generator 48 is a monostable multivibrator and delivers a positive output pulse having a duration of from A to B, FIG. 10, i.e., 1st to 14th dots. The output from the delay generator 48 is differentiated at 49, producing a negative pulse B at the trailing edge of the delayed pulse. The negative pulse triggers a search gate generator 50 into operation, which produces a gating pulse of sufficient duration to span the three or four index pulses, i.e. about the 14th to 18th dots. This gating pulse is generated once during each TV vertical scan. The gate generator 50 is also a monostable multivibrator, which is triggered from a stable state to an unstable state, and after a fixed period, the time for three or four index pulses, transfers to its original stable state.

While the film is being driven through the scanning station, it is being scanned continuously by the cathode-ray tube. As explained in connection with the indexing circuits (FIG. 8), an index pulse is produced for each of the 32 index dots. These index pulses are applied to a counter circuit 52. The counter 52 is of a well-known type, comprising a plurality of binary counters, e.g., Eccles-Jordan multivibrators. When the counter counts to 16, a negative pulse is produced and applied to close the inhibit gate 51, thereby preventing any further index pulses from passing through this part of the circuit. A corresponding pulse from the counter is also applied to an inverter 53 and the inverted output to a search "and" gate 54. The other input to the search "and" gate 54 is the gating pulse from search gate generator 50. The search "and" gate 54 is a diode gate, and when these two inputs are in time coincidence, an output pulse is delivered to a relay 55. The operation of the relay 55 cuts off power to the film drive motor assembly. Precise stopping of the motor is obtained by using a precision clutch brake mechanism, whose output shaft stops immediately upon the power being removed. A vertical synchronizing pulse, amplified at 56, resets the counter at the end of the vertical scanning and the inhibit gate 51 is again opened for a new counting cycle.

FIG. 10 shows one column of 32 index dots within one vertical period and the relative positions of the range gate and search gate pulses.

Continuing with the system logic, the index raster has now been identified and film transport is stopped. The cathode-ray tube scans the raster at the TV rate of 30 frames per second and the binary coded data is read out at high speed and low speed levels. The above described system is more fully disclosed and is claimed in the copending application of V. P. Honeiser et al., entitled "Code Recognition Circuit" filed Aug. 21, 1958, Serial No. 756,321, now U.S. Pat. No. 3,007,138 and assigned to the same assignee as the present application.

High Speed Decoding Unit

Signals from the video amplifier 26 are fed into the indexing circuits shown in dashed lines in FIG. 4, and in detail in FIG. 8. A pulse of about 3 microseconds from the index gate generator 21 permits selection of data only from a particular column i.e., A, B or C. The timing of this pulse is selected with regard to the scanning time so that the pulse time overlaps two columns of informational bits as shown at 60 in FIG. 1. Since this pulse, hereinafter referred to as a wide gate pulse, overlaps two columns of index dots, such things as "keystoning," "raster skew," horizontal shift of index pulses, and horizontal non-linearity are compensated for, thus improving reliability of read-out.

Reviewing the index circuitry in light of the overall system, the index output pulse from the index gate is amplified and triggers the anti-repeat bistable multivibrator 38, which, in turn, opens the reject gate generator 36. The index output pulse also turns off the wide gate generator through inhibit gate 23 (FIG. 8) so that no informational dots in that row can get through the index gate 25. On the desired succeeding horizontal scan the index gate yields the desired index video pulse which passes through the reject gate into a plurality of delay generators 61, 62, 63 and 64, shown in FIG. 4. No further video comes through because the index gate is closed by an index pulse. (This was explained fully in connection with FIG. 8.)

The delay generators 61–64 delay the gated index pulse by varying intervals. The delay intervals are adjusted to coincide with the time position of the four columns of informational bits D, E, F, G, FIG. 1.

The delay generators 61, 62, 63 and 64 are connected respectively to high-speed read-out gates 65, 66, 67 and 68. For example, the delayed pulses may be a series of one-half microsecond pulses. Meanwhile, video pulses corresponding to informational bits are applied from amplifier 27a over line 69a to each of the high-speed read-out gates simultaneously. The read-out gates 65–68 are "and" gates so that when a video pulse coincides with a delayed index pulse, the gate opens, permitting a pulse output to be obtained in that channel. This output pulse is then fed to a high-speed output such as a monitor, or to a low-speed read-out unit or alpha-numeric viewer.

In FIGS. 11 and 4, each selected index pulse is fed into the raster indexing circuit 69 (FIG. 9) over line 70, which yields an output pulse after receiving 16 index pulses. This output pulse is applied over line 71 to energize a low-speed read-out relay 72, and over line 73 to stop the film drive control 74 as explained above. The low-speed read-out relay delivers a continuous signal to a divide-by-526 counter 75. The counter 75 comprises a plurality of multivibrator circuits of a well-known type. The input to the counter passes through an "and" gate 75a. The relay 72 supplies one input, and horizontal synchronizing pulses from generator 11 over line 76 constitutes the second input of the "and" gate 75a. Since there are only 525 lines in a TV raster, the last scanned line in the raster slips down one line with each complete vertical scan. When the count 526 is registered, a pulse is produced by counter 75 which is applied over line 77 to low-speed read-out gates 78–81 and low-speed print gate 82, and over line 83 to column shift gate 84. The operation of these last circuits is fully explained in the copending application by V. P. Honeiser, entitled "Data Readout System," Serial No. 758,707 filed Sept. 3, 1958.

A column shift signal is obtained from column shift gate 84 by coincidence of the vertical synchronizing pulse applied over line 85 and the output of the 526 divider over line 83. The gate 84 is coupled to a low-speed columns selector 86 which may be a stepping switch. Thus, each time the counter 75 delivers a pulse in coincidence with the vertical synchronizing pulse, the selector switch is stepped to select the next column in the order A, B and C.

The column selector 86 is connected to delay generators such as multivibrators or phantastrons 87. The delay generators 87 are controlled by vertical and horizontal sync pulses. Each delay generator 87 is driven at the horizontal rate of 15,750 c.p.s., but only for a total period determined by the duration of the pulse from the vertical delay and gate generator 88. This pulse is usually adjusted to about 80% of a TV field. This feature minimizes picking up undesired video outside of the data raster.

Vertical synchronizing pulses trigger the gate generator 88 which, in turn, conditions the range gate 89, through which the horizontal pulses are obtained. In addition, as previously explained, the vertical synchronizing pulses in coincidence with the output of the 526 counter also drive the shift gate 84.

During high speed read-out, outputs of the high-speed read-out gates are fed into a mixer 90 and the resultant signal is fed to the data monitor 91. Simultaneously signals from the generators 61–64 are fed to mixer 90. In this way, the read gates are superimposed on the data dots as seen on the screen of the monitor. Alignment of the read delay thus becomes a relatively easy process for the operator. The output of the wide gate generator 21 is also fed to the monitor and superimposed on the data for alignment purposes.

At the end of the third column, a signal is delivered by the selector switch 86, over line 92, to an "end low-speed read-out relay" 93. Operation of the relay 93 de-energizes the relay 72 closing the "and" gate 75a so as to interrupt operation of the 526 counter 75. Operation of the relay 93 serves also to actuate the film motor drive over line 94, and over line 95 delivers a signal to a code-punch stop 96. The process of driving another frame of film through the scanner and the operations of detecting a raster are thus repeated.

Low Speed Read-Out Unit

Low speed read-out is obtained by extracting the required video from the high speed system once per TV frame, or at a rate of 30 c.p.s. This is accomplished by using the divide by 526 counter, which gives one output pulse per 526 horizontal pulses. A read-out speed of about five characters per second is obtained, which allows for a safety factor since a Flexowriter paper tape punch unit is used to store the data. Scanning from one horizontal line to the next at the low speed rate is accomplished by operation of the divide by 526 counter which causes the low speed read-out pulse to slip in time by one horizontal line per frame. The operation of the low speed scan is fully explained in detail in the last-mentioned copending application of V. P. Honeiser, entitled "Data Readout System."

Referring now to FIG. 11, which may be placed next to FIG. 4 for a complete schematic of the system, the outputs from the high-speed read-out gates are applied to the low speed gates 78–81. Of course, an output from the high-speed gate is obtained only when video is present in that particular channel.

Similarly, an output from any of the low speed gates is obtained only when there is coincidence between the high-speed gate output, and the low-speed "break-in" pulse from the 526 divider over line 77.

An unique circuit for simultaneous indexing of low-speed read-out for the Flexowriter and high-speed presentation on the alpha-numeric viewer is shown in FIG. 12, which circuit is represented at 87, 86, 84 and 89 in FIG. 4.

Referring now to FIG. 12, high speed readout indexing, that is, readouts for each line of scanning is accomplished by applying gated horizontal sync pulses from the range gate 89 to inhibitor gate 97. Gate 97 passes pulses from gate 89 provided the monostable multivibrator 98 is conducting in its stable state. The output pulse from gate 97 is applied to the three "and" gates 99. Each of the three "and" gates 99 may be conditioned to conduct respectively depending on what number the counter 87b is reading. The counter 87b in this embodiment is reading any of the numbers 1 through 3. The counter 87a is in effect a high speed column selector. A complete detailed explanation is found in the above-mentioned copending application by V. P. Honeiser, entitled "Data Readout System." In other words, the distributor or counter 87b determines which of the three columns A, B or C is to be read out. The scans are followed for each of the columns in the order A, B, C, A, B and so on. Thus, only one of the three "and" gates 99 is opened at any instant of time. The outputs from the gates 99 are respectively applied to an associated one of the three phantastrons 103. If we assume that the first gate 99a is open, the pulse applied from gate 97 produces a corresponding pulse in the first gate 99a which triggers the phantastron 103a into operation. The delay pulse introduced by phantastron A is adjusted so that the trailing edge of the pulse terminates shortly before the time position of the index dot in column A. The delayed pulse from the phantastron is differentiated to provide a negative trigger pulse to be applied to the index gate generator 87a shown in FIG. 4 and it becomes clear that the generator pulse will be at such time as to include the index dot video.

Low speed readout indexing, that is, reading out one line of information per frame is accomplished by applying a low speed break-in pulse from the 526th counter 75 to the monostable multivibrator 98. Triggering of the multivibrator 98 "closes" gate 97 and opens gate 104. The transfer time of multivibrator 98 is adjusted to permit one horizontal sync pulse to pass through gate 104. Thereafter gate 104 closes until another pulse is received from monostable multivibrator 98 which is one TV frame plus one line later.

The horizontal sync pulse which passed through gate 104 is inverted at 105 and fed to the low speed column gates 100, 101 and 102. One of these gates is subsequently opened by the low speed column selector illustrated as stepping switch 86b. The stepping switch is advanced to open the respective gates 100, 101 and 102, when there is coincidence between a 526th pulse from 75 and a vertical sync pulse from the sync pulse generator. The coincidence and resultant signal therefrom is accomplished at the "and" gate 86c. If the stepping switch 86b were sitting in a position such that column A should be the column subjected to the low speed readout, then the gate 100 would deliver an output to the phantastron 103a. The phantastron in turn delivers an output pulse, as described above, to operate in conjunction with producing an index gating pulse.

Code Converters

A code converter 107, shown diagrammatically, comprises a diode matrix connected directly to plates of pulse stretching multivibrators. There is one multivibrator for each channel of information. The six output channels are connected to grids of buffer tubes, each tube containing a plate relay as a load. A positive pulse out of any channel of the matrix causes the corresponding relay to be picked up.

The contact on the relay then picks up a selector magnet in a Flexowriter punch unit 108. A print signal is delivered to the punch unit through a separate channel comprising low-speed gate 82 and pulse stretcher 109. The pulse stretcher 109 produces a print signal which causes the proper character to be punched into the tape. The numbers and letters 1, 2, 4, 8, 0, *x* preceding the punch unit 108 are intended to suggest representative alpha-numeric characters which are punched into the tape.

The code converter also includes a print pulse counter 110 which acts as a checking circuit. The output of this counter is gated with the column shift signal, and the output is connected to the alarm and stop circuits 111. A proper count resets the counter and no alarm signal is given. If the count of 32 print pulses is missed by a preset amount, a stop signal from the circuit 111 is applied over line 112 to de-energize relay 72 and stop the 526 divider.

A paper tape reader 114 for the Flexowriter comprises a set of contacts operated by feeler pins, having as an input the information stored on the paper tape by the punch unit.

In addition to the conversion circuitry, each code converter unit contains control circuits for its associated connecting equipment, such as "start print," "start punch," "carriage return," etc. for external remote control and programming of the Flexowriter.

Flim Drive Control Unit

The "stop" read-out pulse from the "end low-speed read-out" relay circuits 93 triggers a motor control, and power is immediately applied to the film drive motor which moves the film at a uniform rate. As the film moves, a new frame enters the scanner lens system. When the first column of 16 index video pulses passes through the wide gate generator, the raster indexing circuit 69 yields an output pulse which triggers the motor control and instantaneously removes power from the film drive motor.

Alpha-Numeric Viewer

The alpha-numeric viewer which can be of the type described in the copending application of C. E. Jones et al., entitled "Alpha Numeric Viewer," Serial No. 728,927, filed April 16, 1958, gives an immediate presentation of the alpha-numeric information of the frame in the reader. This viewer operates in parallel with a film titler, or independently of it. The film titler can be switched on or off while the viewer is operating. Thus, digital data can be monitored, and only selected frames titled if desired. The viewer comprises the control circuitry for the tubes and the viewer itself.

Film Titler

The film titler 115 insofar as typing on film is accomplished is described in copending application by J. P. Davis et al., entitled "Film Printing," Serial No. 722,469, filed March 19, 1958, and assigned to the assignee of this application.

The titler 115 titles the film in alpha-numeric form with the same information that has been recorded on the film in binary form. The titler consists of a read-out to type delay, a typer and necessary film transport and indexing systems.

As each frame is read-out, it is necessary to take the information from the converter 107 and store it until the proper frame reaches the typing position. This function is provided by the tape punch head on the Flexowriter. As the conversion unit reads out the data from one frame, it provides an output to the Flexowriter tape punch unit. Each frame of titled information is punched into the paper tape in binary form. At the end of each frame a stop code character is punched into the tape. This operation is provided by the "end slow speed read out circuit" 93. The actual titling of the film will then be done automatically by a tape reader and a typewriter.

This method of storing allows corrections to be made easily before the information is typed on the film. The operator is able to delete any character and insert additional information by manual operation of the tape punch.

As a frame of film reaches the typewriter, the corresponding stored information will reach the tape reader head on the Flexowriter. The film is then titled with the alpha-numeric information in the space adjacent to the photograph which it identifies.

Typing of film with a gold-leaf ribbon, as described in the above-mentioned copending application entitled "Film Printing," has proved to give good results. After typing, the film is moved through a spray station 116, under control of a time-operated spray motor 117. The timer 118 for the motor 117 is controlled by a relay 119. These several electromechanical operations are generally controlled by a line feed circuit 120 which in turn is controlled by a pulse from the raster indexing circuit 69. The typed film is sprayed with a protective coating of clear plastic to prevent smudging of the characters.

Summary of Operation

The operator manually threads a leader of film through the film transport system and a leader of paper tape through the Flexowriter tape punch and reader head. The operator then pushes a start button to energize a stepping switch which controls the sequence of operations. The film drive control unit drives the film through the scanner until the first frame is positioned. At that point the film drive is automatically shut-off and the operator makes the necessary adjustments by means of the data monitor to align the gating signals of the decoding circuits with the video information as presented on the data monitor. The operator then pushes the start button and at this point the low speed read-out unit starts reading-out one column of data. This information is punched into the Flexowriter tape. When 32 rows have been read at low speed the column shift gate provides a carriage return signal to be punched and also provides a signal to step the low speed read-out gate to the second column of data. This cycle is repeated for each column of data. After the last row on the last column is read-out, the column shift gate 84 steps the scanning gate to its initial position and also provides a signal, through the column selector 86, to shut-off the low speed read-out scan. An additional signal from this counter allows the film drive control unit to move the film until the next frame is properly positioned. While the film is being driven through the scanner, the line feed circuits through a relay operate the Flexowriter to move the film to a distance of one frame through the typer.

When the next film frame has been positioned in the scanner, a signal from the film drive control unit starts the low speed read-out and the read-out cycle is repeated. As the scanning of each frame is completed, the master stepping switch is advanced one position. When enough frames have been scanned to have the first frame reach the typing position, the automatic operation stops and the operator checks the alignment of film in the typewriter. The control circuits to provide this operation are represented by the line feed circuits block 120 of FIG. 11. The circuits in actual practice are relay logic to provide a count which indicates that the film or platen of the typewriter has been stepped a predetermined number of times.

The next operation of the start button causes the same scanning cycle to repeat and in addition provides a start read signal to the Flexowriter. On this signal the typer titles the first frame of film with its corresponding alpha-numeric data. The tape reader automatically stops on completion of entitling one frame. The completion of the low-speed read-out again causes the film to be moved one frame length. When the film is positioned, low-speed read-out is started as before. As each frame is being read out, a frame is being titled at the typer. This sequence continues until the first frame on the roll reaches the spraying position. At this point, the automatic operations are stopped and the operator checks the alignment of the film for spraying. Each time the film is moved to a new frame the scanning, typing and spraying operations take place automatically on three different frames of data. In the event of film breakage, over travel or under travel, the film drives will be automatically turned off by limit switches as shown by legends in FIG. 11. These switches are built into the film transport system.

While the foregoing description sets forth the principles of the invention in connection with specific apparatus, it is to be clearly understood that this description is made only by way of example and not as a limitation of the scope of the invention as set forth in the objects thereof and in the accompanying claims.

We claim:

1. A data processing system, comprising a record divided into discrete sections, each section containing encoded data arranged in a plurality of columns and rows, means for repeatedly scanning said data, transport means for moving said record into the field of said scanning means, means coupled to said scanning means for reading out a single column of said data and including counter means for producing a transport-stop signal when a predetermined number of rows has been counted, means for applying said signal to said record transport means whereby said record is stopped, means operable after said record is stopped for reading-out said coded data at the scanning speed, means coupled to said read-out means for converting the coded data into printable characters, and means for reading-out said printable characters at a fraction of said scanning speed.

2. The system according to claim 1, wherein said read-out means for said printable characters comprises a teleprinter, and further comprising means for transporting said record to said teleprinter, and said teleprinter including means for printing characters on sections of said record bearing the same information in code.

3. The system according to claim 2, wherein said coded data is in the form of a raster including data and index marks, and said scanning means scans said raster in sequential lines and produces a succession of pulses corresponding to the data and index marks, each complete scanning of the raster constituting a frame, a low-speed read-out pulse generator synchronized with said scanning means for producing pulses separated by a period equal to the period between the time the scanning moves from a point on one line of one frame to a corresponding point on the next line of the next frame, means responsive to the coincidence of said low-speed read-out pulses and said index pulses for producing gating pulses, and means responsive to each of the gating pulses for feeding a different row of said data pulses to said code converting means.

4. The system according to claim 3, and further including a source of synchronizing pulses, means responsive to said synchronizing pulses for controlling said scanning means, and said low-speed read-out pulse generator including a pulse frequency divider coupled to said synchronizing pulse source for producing said separated pulses corresponding to a period equal to a frame and a line.

5. A system according to claim 3 and further including means for adjusting said low-speed read-out pulses to coincide with different ones of said index pulses in different frames.

6. A system according to claim 5, in which the data on said record consists of data marks arranged in rows, the scanning lines running parallel to each other and to said rows, with at least one index mark associated with each row of data marks, the scanning lines being closer to each other than the height of an index mark whereby a plurality of index pulses are produced for each index mark, and further comprising inhibiting means for blocking said coincidence means after one gating pulse has been produced for a corresponding index mark until the next index pulse corresponding to another index mark is fed to said coincidence means simultaneously with a low-speed read-out pulse.

7. The system according to claim 3, wherein said scanning means scans said data is a succession of lines so close to each other that each index mark is scanned by at least two successive lines, whereby at least two index pulses are produced for each index mark, a bistable device, means responsive to the coincidence of one of said low-speed read-out pulses and one of said index pulses for tripping said device from its first state to its second state, means responsive to the occurrence of one of said low-speed read-out pulses without the coincidence of one of said index pulses to reset said bistable device, means responsive to the tripping of said bistable device to produce a gating pulse, and means responsive to each gating pulse for feeding a different row of data pulses from a different one of said frames to said code converting means.

8. A data processing system, comprising a roll of film containing a plurality of frames, each frame bearing a record raster in the form of a plurality of parallel rows of index and data marks, each row consisting of an index mark followed by a given number of data marks, scanning means, film transporting means for moving said film into the field of said scanning means, said scanning means repeatedly scanning said record in lines parallel to said rows and producing a succession of pulses corresponding to said data and index marks, each complete scanning of the record constituting a frame, a raster indexing circuit coupled to said scanning means and said film transport means for counting consecutive index pulses and for producing a film-stop signal upon said count reaching a predetermined number, whereby the film is positioned for data read-out, a high-speed read-out circuit coupled to said scanning means for reading-out data marks of consecutive rows at the scanning speed, a low-speed read-out circuit coupled to the output of said high-speed read-out circuit for reading-out data marks at a small fraction of the scanning speed, means coupled to said low-speed read-out circuit for converting said code into printable characters, apparatus for printing said characters on predetermined frames of said film, and means for delaying the transfer of characters to said apparatus so that the characters are printed on the frame bearing the same information in code.

9. The system according to claim 8, wherein said high-speed read-out circuit includes a scanning type monitor, and means for synchronizing said scanning means with said monitor.

10. The system according to claim 8, wherein said scanning means comprises a flying spot scanner.

11. The system according to claim 8, wherein said scanning means comprises a TV type camera tube.

12. The system according to claim 9, wherein said high-speed read-out circuit comprises a plurality of coincident gates corresponding to the number of data positions in said rows, means responsive to the scanning of an index mark for applying one index pulse to each of said gates, means for applying the data pulses following said index pulse to said gates respectively, the position of the data marks in the row determining the gates to which the corresponding data pulses are applied, each of said gates producing an output pulse in response to coincident application of said index and data pulses, said output pulse indicating a data mark in a particular position in the row being read-out.

13. The system according to claim 12, wherein said low-speed read-out circuit comprises a plurality of coincident gates coupled respectively to said high-speed read-out gates, a source of horizontal and vertical synchronizing pulses, a scanning line counter, means for applying said horizontal synchronizing pulses to said line counter, said line counter being adjusted to deliver an output pulse in response to one more than the total number of lines in a frame, whereby the pulse is delivered for a different line each time, the lines slipping down through the frame one line at a time, and means for applying said counter output pulse to each of said low-speed gates, whereby one row and a different row of data information is read-out for each frame being scanned.

14. The system according to claim 13, wherein said printing apparatus comprises an automatic typewriter, a paper tape punch unit for operating said automatic typewriter and means for punching said characters in said tape, the movement of said tape from said punch unit to said typewriter constituting said delay means.

15. The system according to claim 14, wherein said raster comprises three separate columns of index and data marks, each column consisting of 32 rows, and further comprising an indexing circuit for controlling the read-out circuits to read one column at a time and means for stepping the indexing circuit so that the columns are read one after the other.

References Cited in the file of this patent

UNITED STATES PATENTS

| | | |
|---|---|---|
| 2,702,380 | Brustman | Feb. 15, 1955 |
| 2,782,398 | West | Feb. 19, 1957 |
| 2,782,985 | Vibbard | Feb. 26, 1957 |
| 2,807,664 | Kleinberg | Sept. 24, 1957 |